(12) United States Patent
Hino et al.

(10) Patent No.: US 6,713,923 B2
(45) Date of Patent: Mar. 30, 2004

(54) ORIENTATION DEVICE AND MAGNETIZATION DEVICE

(75) Inventors: Haruyoshi Hino, Iwata (JP); Shinya Naito, Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 64 days.

(21) Appl. No.: 10/208,159

(22) Filed: Jul. 30, 2002

(65) Prior Publication Data

US 2003/0025415 A1 Feb. 6, 2003

(30) Foreign Application Priority Data

Aug. 3, 2001 (JP) ........................................ 2001-235937

(51) Int. Cl.$^7$ ............................................. H02K 21/12
(52) U.S. Cl. ........................... 310/156.56; 310/156.38; 310/156.48; 310/156.55; 310/156.56; 310/156.57; 310/156.59; 310/156.61; 310/162; 310/261
(58) Field of Search ....................... 310/156.38, 156.48, 310/156.55–156.61, 162

(56) References Cited

U.S. PATENT DOCUMENTS

| | | | | |
|---|---|---|---|---|
| 2,062,938 A | * | 12/1936 | Ruppe ......................... 310/254 |
| 3,072,813 A | * | 1/1963 | Reijnst et al. .......... 310/156.55 |
| 3,401,287 A | * | 9/1968 | French et al. ................. 310/168 |
| 4,007,387 A | * | 2/1977 | Rustecki ....................... 310/42 |
| 4,296,544 A | * | 10/1981 | Burgmeier et al. ............ 29/598 |
| 4,434,546 A | * | 3/1984 | Hershberger .................. 29/598 |
| 5,038,065 A | * | 8/1991 | Matsubayashi et al. ..... 310/162 |
| 5,693,250 A | * | 12/1997 | El-Antably et al. ...... 252/62.54 |
| 6,064,134 A | * | 5/2000 | El-Antably et al. ......... 310/261 |
| 6,229,239 B1 | * | 5/2001 | Lucidarme et al. ......... 310/162 |
| 6,323,572 B1 | * | 11/2001 | Kinoshita .............. 310/156.07 |
| 6,437,473 B1 | * | 8/2002 | Mobius et al. ......... 310/156.21 |

FOREIGN PATENT DOCUMENTS

| | | | |
|---|---|---|---|
| EP | 1176 700 A2 | 1/2002 | |
| JP | 57206267 A | * 12/1982 | .......... H02K/37/00 |
| JP | 10-38242 A | 2/1998 | |
| JP | 11 206075 A | 10/1999 | |
| JP | 2000069730 A | * 3/2000 | .......... H02K/19/22 |
| JP | 2001 169514 A | 2/2001 | |

* cited by examiner

*Primary Examiner*—Nestor Ramirez
*Assistant Examiner*—J. Aguirrechea
(74) *Attorney, Agent, or Firm*—Young & Basile, P.C.

(57) ABSTRACT

To provide an orientation device capable of efficiently orientating resinous magnets filled in slits of a rotor core.

An orientation device comprising a plurality of permanent magnets 5 disposed at the same intervals as slits 2 in the rotor core 1 with their magnetic poles of the same polarity adjacent to each other, along the outside circumference of a rotor core housing section 4 for housing the rotor core 1, and a plurality of pole pieces 6 disposed between the plurality of permanent magnets 5, wherein the width of the pole piece 6 at the end 6a on the side of the rotor core housing section 4 is no larger than the maximum width α max of an outermost slit 2a of the rotor core 1 between opposite ends thereof.

5 Claims, 5 Drawing Sheets

ORIENTATION DEVICE AND MAGNETIZATION DEVICE

BACKGROUND OF THE INVENTION

1. Field of the Invention

This invention relates to an orientation device and a magnetization device for use in housing a rotor core of a magnet embedded type rotor inside for a rotary electric machine such as an electric motor or a generator to form permanent magnets in slits for each magnetic pole of the rotor core, and particularly to an orientation device capable of efficiently orientating resinous magnets disposed in slits of a rotor core and a magnetization device capable of efficiently magnetizing the orientated resinous magnets and the like.

2. Description of the Related Art

Heretofore, in an embedded magnet type rotor, orientation of resinous magnets 3 filled in slits 2 for each magnetic pole of a rotor core 1 has been performed through an arrangement as shown in FIG. 6. That is, a forming die 7 was used which comprises a plurality of permanent magnets 5 disposed along the outside circumference of a rotor core housing section 4 at the same intervals as the slits 2 with their magnetic poles of the same polarity adjacent to each other, and a plurality of pole pieces 6 disposed between the plurality of permanent magnets 5 along the outside circumference of the rotor core housing section 4.

The rotor core 1 is disposed in the rotor core housing section 4, and as shown in FIG. 6 by a dashed line, magnetic flux is generated heading from the plurality of permanent magnets 5 through the pole pieces 6 toward the resinous magnets 3 so as to orientate the resinous magnets 3 filled in the slits 2.

However, since in the orientation method using a forming die 7 as described above, magnetic resistance of the slits 2 is larger than that of the rotor core 1, magnetic flux generated by the permanent magnets 5 avoids the resinous magnets 3 filled in the outermost slits 2a of the rotor core 1, as shown in FIG. 7 by dashed lines, resulting in an insufficient orientation of the outermost resinous magnets 3.

In a rotary electric machine using such an embedded magnet type rotor, since the magnitude of the output torque generally depends on the magnetic flux generated by the resinous magnets 3, if the orientation of the resinous magnets 3 is insufficient and the magnetic flux from the resinous magnets 3 decreases, the output torque is decreased, which lowers the performance for the rotary electric machine.

Such a problem arises not only at the time of the orientation of resinous magnets, but also arises at the time of magnetization of permanent magnets.

In view of the foregoing, an object of this invention is to provide an orientation device capable of efficiently orientating resinous magnets filled in slits of a rotor core, and a magnetization device capable of efficiently magnetizing permanent magnets disposed in the slits of the rotor core.

SUMMARY OF THE INVENTION

To achieve the former of the foregoing object, the orientation device according to claim 1 is characterized by an orientation device adapted to house a rotor core of an embedded magnet type rotor inside for orientating resinous magnets filled in slits for each magnetic pole of the rotor core, said orientation device comprising a plurality of permanent magnets disposed at the same intervals as said slits with their magnetic poles of the same polarity adjacent to each other, along the outside circumference of a rotor core housing section for housing said rotor core, and a plurality of pole pieces made of a ferromagnetic material and disposed between said plurality of permanent magnets, wherein the width of said pole piece at the end on the side of said rotor core housing section is smaller than that of an outermost slit of said rotor core between opposite ends thereof.

In addition, the invention according to claim 2 is characterized by the orientation device according to the invention of claim 1, wherein the width of said permanent magnet is larger at the end on the side remote from said rotor core housing section than at the end on the side of said rotor core housing section.

Further, the invention according to claim 3 is characterized by the orientation device according to the invention of claim 1 or 2, wherein a member disposed around said pole pieces and said permanent magnets is made of a non-magnetic material.

On the other hand, to achieve the former of the foregoing object, the orientation device according to claim 4 is characterized by an orientation device adapted to house a rotor core of an embedded magnet type rotor inside for orientating resinous magnets filled in slits for each magnetic pole of the rotor core, said orientation device comprising a plurality of permanent magnets made of a ferromagnetic material and disposed at the same intervals as said slits along the outside circumference of a rotor core housing section for housing said rotor core, solenoid coils wound on said pole pieces, and a connection member made of a ferromagnetic material and connecting the outside circumferential portions of said pole pieces, wherein the width of said pole piece at the end on the side of said rotor core housing section is smaller than that of an outermost slit of said rotor core between opposite ends thereof. Regarding the pole pieces and the connection member, they may be provided in separated relation, or in integrated relation.

Further, to achieve the latter of the foregoing object, the magnetization device according to claim 5 is characterized by a magnetization device for magnetizing permanent magnets disposed in slits for each magnetic pole of the rotor core, said magnetization device comprising a plurality of permanent magnets made of a ferromagnetic material and disposed at the same intervals as said slits along the outside circumference of a rotor core housing section for housing said rotor core, solenoid coils wound on said pole pieces, and a connection member made of a ferromagnetic material and connecting the outside circumferential portions of said pole pieces, wherein the width of said pole piece at the end on the side of said rotor core housing section is smaller than that of an outermost slit of said rotor core between opposite ends thereof. Regarding the pole pieces and the connection member, they may be provided in separated relation, or in integrated relation, as in the invention according to claim 4. In addition, regarding the permanent magnets disposed in the slits, they may be formed by resinous magnets filled in the slits and orientated, or may be sintered magnets inserted in the slits.

Therefore, since in the orientation device according to claim 1 and 4, the width of the pole piece at the end on the side of said rotor core housing section is smaller than that of an outermost slit of said rotor core between opposite ends thereof, magnetic flux generated by permanent magnets or solenoid coils for orientation is prevented from avoiding resinous magnets filled in the outermost slits of the rotor core, which enables efficient and sufficient orientation of the resinous magnets filled in the slits for each magnetic pole of the rotor core, whereby a larger output torque is effected in a rotary electric machine using such an embedded magnet type rotor, improving performance for the rotary electric machine.

If the slit of the rotor core has a measurable thickness, the width of the pole piece at the end on the side of the rotor core housing section may be made smaller than the maximum width of the outermost slit of the rotor core between opposite ends thereof.

Further, since in the orientation device according to claim 2, the width of the permanent magnet is larger at the end on the side remote from the rotor core housing section than at the end on the side of the rotor core housing section, magnetic resistance of the pole piece in the side remote from the rotor core housing section will increase compared to when permanent magnets with opposite ends of the same width are used. As a result, magnetic flux passing through the pole pieces on the sides of the rotor core housing section is increased, providing effective and sufficient orientation of resinous magnets filled in the slits of the rotor core.

Furthermore, since in the orientation device according to claim 3, a member disposed around the pole pieces and the permanent magnets is made of a nonmagnetic material, magnetic resistance of the permanent magnets in the outside circumferential sides will increase. As a result, magnetic flux passing through the pole pieces on the sides of the rotor core housing section is increased, providing effective and sufficient orientation of resinous magnets filled in the slits of the rotor core.

On the other hand, since in the magnetization device according to claim 5, the width of the pole piece at the end on the side of the rotor core housing section is smaller than that of an outermost slit of the rotor core between opposite ends thereof, magnetic flux generated by solenoid coils for magnetization is prevented from avoiding permanent magnets filled in the outermost slits of the rotor core, which enables efficient and sufficient magnetization of the permanent magnets disposed in the slits for each magnetic pole of the rotor core, whereby a larger output torque is effected in a rotary electric machine using such an embedded magnet type rotor, improving performance for the rotary electric machine.

DETAILED DESCRIPTION OF THE PREFERRED EMBODIMENTS

Figure 6:
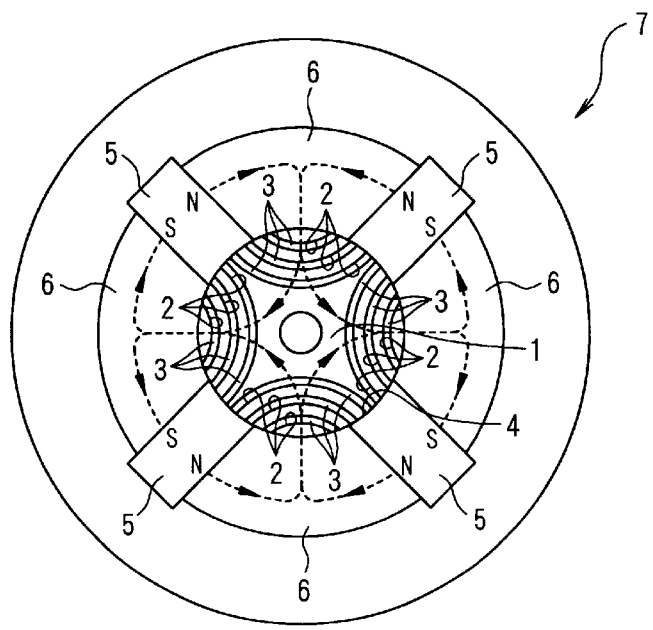
FIG. 6 is a plan view showing a conventional forming die, corresponding to FIG. 1(b)
Figure 7:
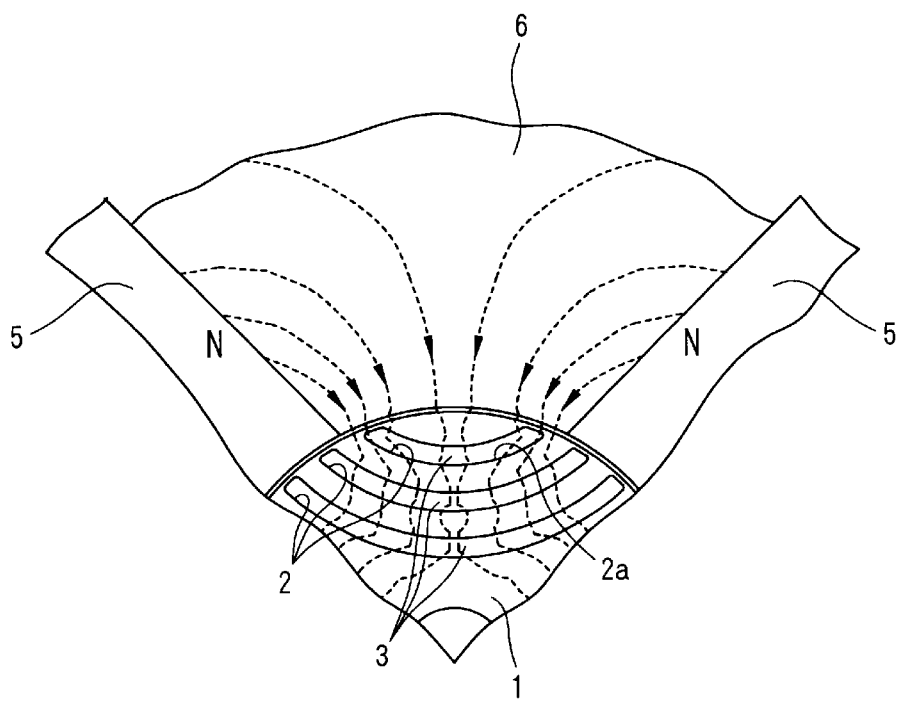
FIG. 7 is an enlarged view of a primary portion of the same, illustrating the function of the forming die of FIG. 6, corresponding to FIG. 3.

An embodiment of an orientation device according to this embodiment will be described with reference to the drawings. Like parts corresponding to FIG. 6 and FIG. 7 are designated by like numerals.

Figure 1:
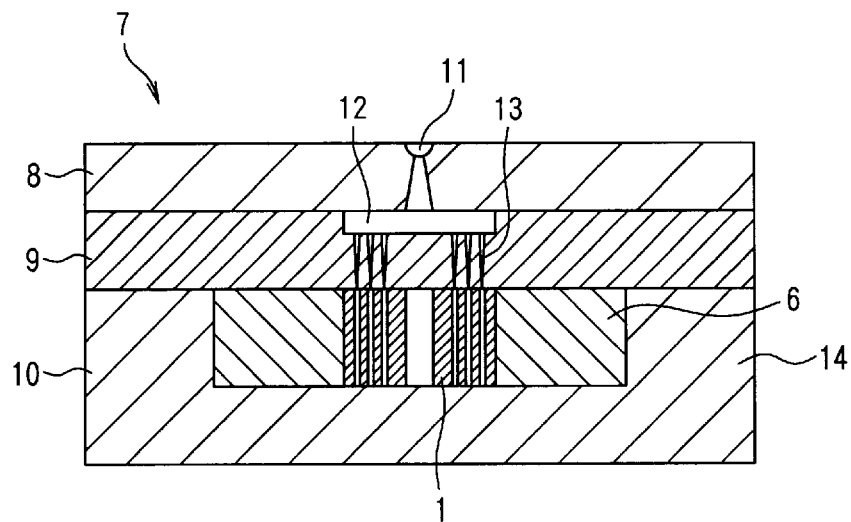
FIG. 1 are views showing the construction of a forming die as an orientation device of this invention, and (a) is a sectional view taken along line A—A of (b), and (b) is a plan view of the same, with the upper and the intermediate dies removed.
Figure 1:
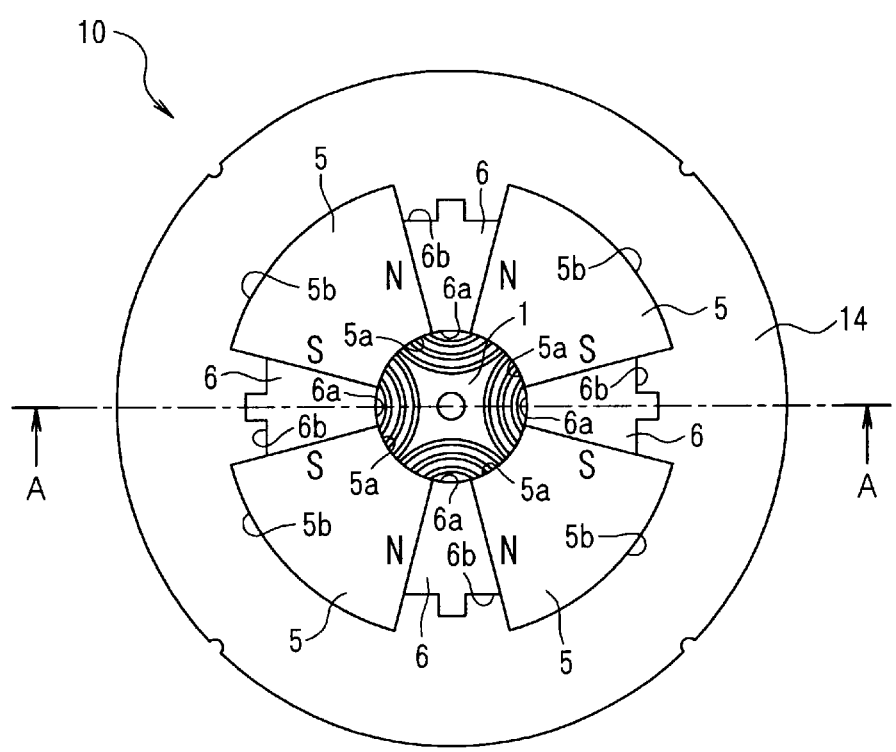

FIG. 1 are views showing the construction of a forming die as an orientation device of this invention.

The forming die 7 is comprised, as shown in FIG. 1(a), of an upper die 8, an intermediate die 9 and a lower die 10, and the upper die 8 is provided with an injection gate 11 through which resinous magnet 3 is injected from the outside. The intermediate die 9 is provided with a sprue runner 12 and gates 13 through which the injected resinous magnet 3 is filled in each of slits 2 of a rotor core 1.

Also, the lower die 10 is provided, as shown in FIG. 1(b) of a plan view of the lower die 10, centrally with a rotor core housing section 4 for housing the rotor core 1, and a plurality of permanent magnets 5 are disposed at the same intervals as the slits 2 of the rotor core 1 with their magnetic poles of the same polarity adjacent to each other, along the outside circumference of the rotor core housing section 4. The permanent magnet 5 has a larger width at the end 5b on the side remote from the rotor core housing section 4, three or four times as large as the width of the end 5a on the side of the rotor core housing section 4.

Figure 2:
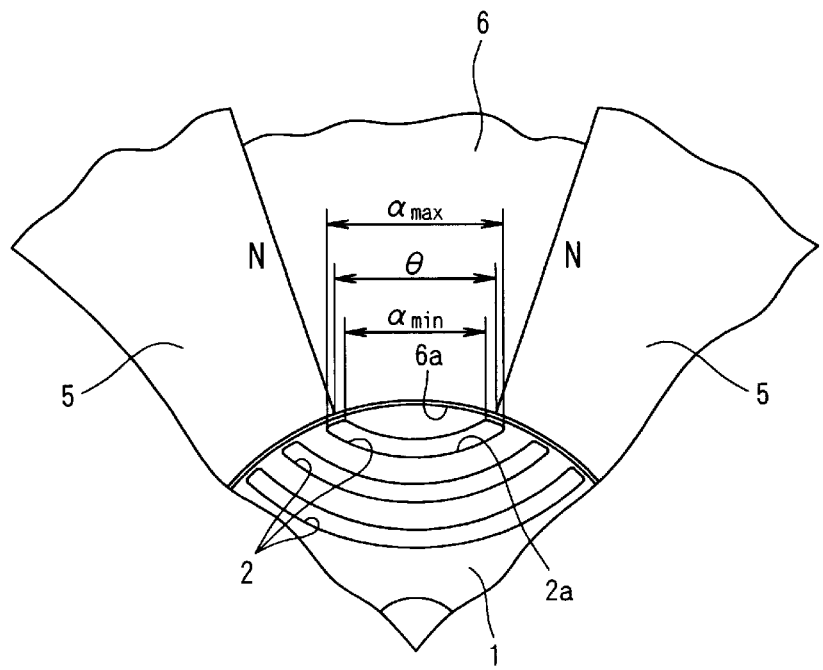
FIG. 2 is an enlarged view of a primary portion of the same, illustrating the relation between the forming die and the slits of FIG. 1.

Between the permanent magnets 5 are disposed a plurality of pole pieces 6 made of a ferromagnetic material, and as shown in FIG. 2 of an enlarged view of a primary portion of FIG. 1(b), the pole piece 6 has a width θ at the end 6a on the side of the rotor core housing section 4, which is the mean value of the maximum width α max and the minimum width α min of an outermost slit 2a of the rotor core between opposite ends thereof.

Also, at the ends 5b, 6b of the permanent magnets 5 and the pole pieces 6 on the side remote from the rotor core housing section 4 is disposed a non-magnetic member 14 surrounding these components.

Now, a procedure will be described for filling resinous magnet 3 into arc-shaped slits 2 provided in three layers in the rotor core 1, three for each of four magnetic poles disposed in the rotor, by using the foregoing forming die 7.

First, as shown in FIG. 1(b), the rotor core 1 is mounted in the rotor core housing section 4 of the lower die 10 before filling of the resinous magnet 3, and the ends of the slits 2 of the rotor core 1 are directed toward the permanent magnets 5.

Then, the intermediate die 9 and the upper die 8 are placed on the upper surface of the lower die 10, and thereafter resinous magnet 3 is injected from the injection gate 11 of the upper die 8. Then, the resinous magnet 3 injected from the injection gate 11 is filled into each of the slits 2 of the rotor core 1 housed in the lower die 10 through the sprue runners 12 and the gate 13 of the intermediate die 9. At this time, magnetic flux is generated heading from the permanent magnets 5 through the pole pieces 6 toward the resinous magnets, and as shown in FIG. 3 by a plurality of dashed lines, the magnetic flux flows inwardly from the outermost side of the rotor core 1, passing successively through the resinous magnets 3 filled in the slits 2a to orientate the resinous magnets 3 disposed in the slits 2 for each magnetic pole.

Figure 3:
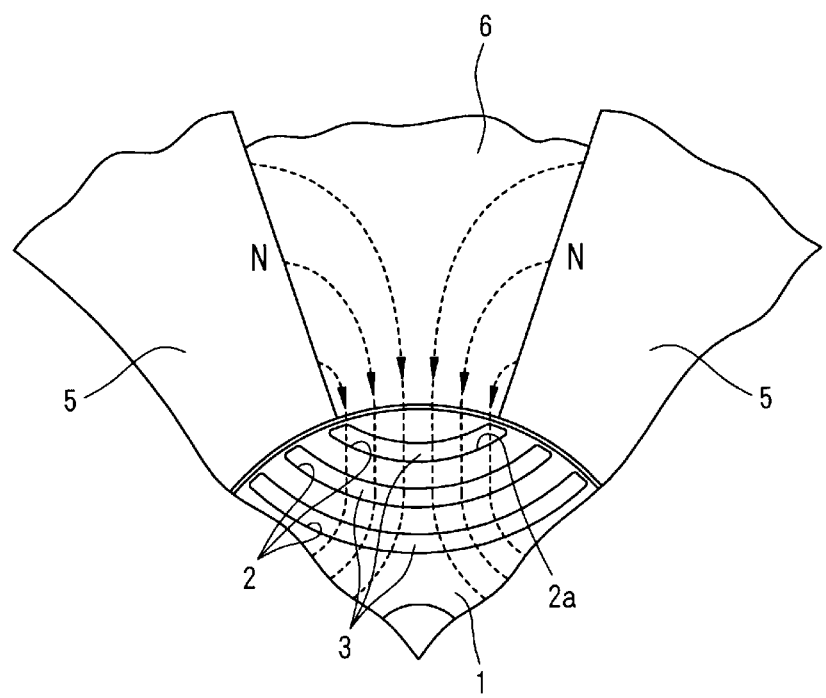
FIG. 3 is an enlarged view of a primary portion of the same, illustrating the flow of magnetic flux generated by the permanent magnets of FIG. 1.
Figure 4C:
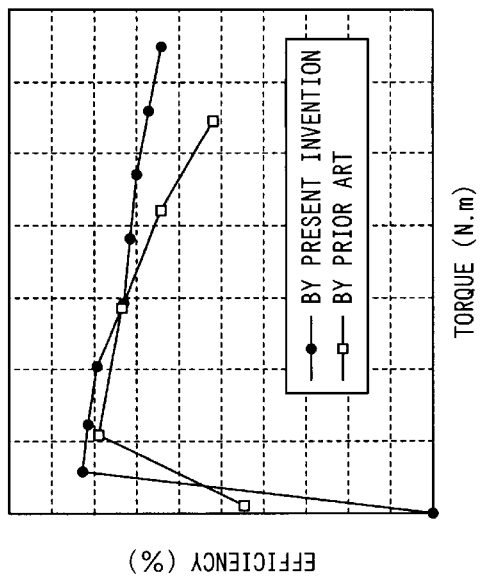
FIG. 4 are graphs showing performance of a rotary electric machine manufactured using the forming die of FIG. 1.
Figure 4D:
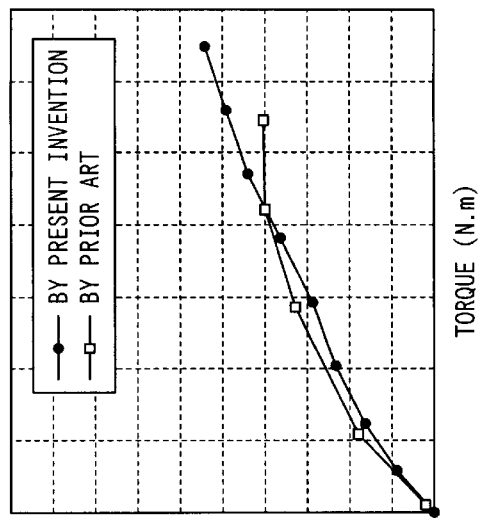
Figure 4A:
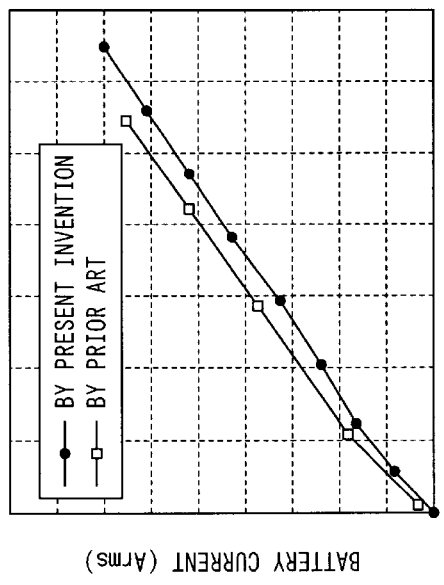
Figure 4B:
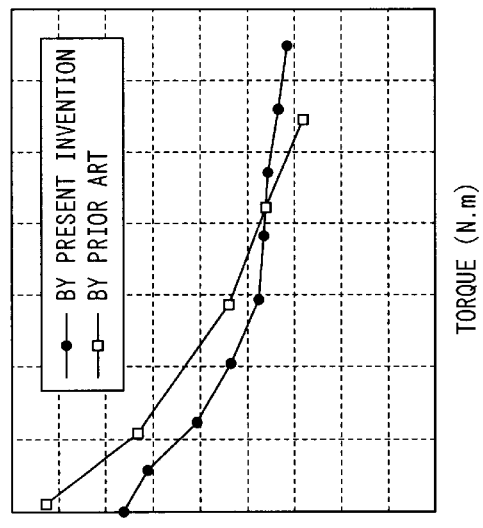

In the orientation device of this embodiment as described above, the width of the pole piece 6 at the end 6a on the side of said rotor core housing section 4 is smaller than the width of an outermost slit 2a of the rotor core 1 between opposite ends thereof, therefore as shown in FIG. 3 by a plurality of dashed lines, magnetic flux generated by the permanent magnets 5 doesn't avoid the resinous magnets 3 filled in the outermost slits 2a of the rotor core 1, providing efficient and sufficient orientation of the resinous magnets 3 disposed in the slits 2 for each magnetic pole of the rotor core 1. Also, in a rotary electric machine using such an embedded magnet type rotor, improvement in performance for the rotary electric machine is effected, such as increased output torque, as shown in FIGS. 4(a)–(d).

In addition, the width of the permanent magnet 5 is larger at the end 5b on the side remote from the rotor core housing section 4 than at the end 5a on the side of the rotor core housing section 4, therefore magnetic resistance of the pole piece 6 on the side remote from the rotor core housing section 4 will increase compared to when permanent magnets with opposite ends 5a and 5b of the same width are used. As a result, magnetic flux passing through the pole pieces on the sides of the rotor core housing section 4 is increased, providing effective and sufficient orientation of resinous magnets 3 disposed in the slits 2 of the rotor core 1.

Further, the member disposed around the pole pieces 6 and the permanent magnets 5 is made of a non-magnetic material, therefore magnetic resistance of the permanent magnets 5 on the outside circumferential sides will increase. As a result, magnetic flux passing through the pole pieces on the sides of the rotor core housing section 4 is increased, providing effective and sufficient orientation of resinous magnets 3 disposed in the slits 2 of the rotor core 1. In addition, the foregoing embodiment shows an example of the orientation device according to this invention and is not limited to a shape of the rotor core 1 to be housed or a type of magnets for orientation.

Although in the foregoing embodiment, an example has been shown in which the width θ of the pole piece 6 at the end 6a on the side of the rotor core housing section 4 is the mean value of the maximum width α max and the minimum width α min of the outermost slit 2a of the rotor core 1 between opposite ends thereof, this invention is not limited to that, and the width θ of the pole piece 6 at the end 6a on the side of the rotor core housing section 4 may be the maximum width α max of the outermost slit 2a of the rotor core 1, or may be smaller than the minimum width min.

In addition, although an example has been shown in which a rotor core 1 provided with slits 2 in three layers is housed, and resinous magnets 3 filled in the slits 2 are orientated, this embodiment doesn't limit the configuration of the rotor core 1, and the rotor core 1 may be provided with more than three slits 2 per one magnetic pole, or one slit 2 per one magnetic pole. Further, although an example has been shown in which orientation is performed of the resinous magnets 3 filled in the arc-shaped slits 2, the shape of the slit 2 is not limited to that, and the slit may have another shape.

Figure 5:
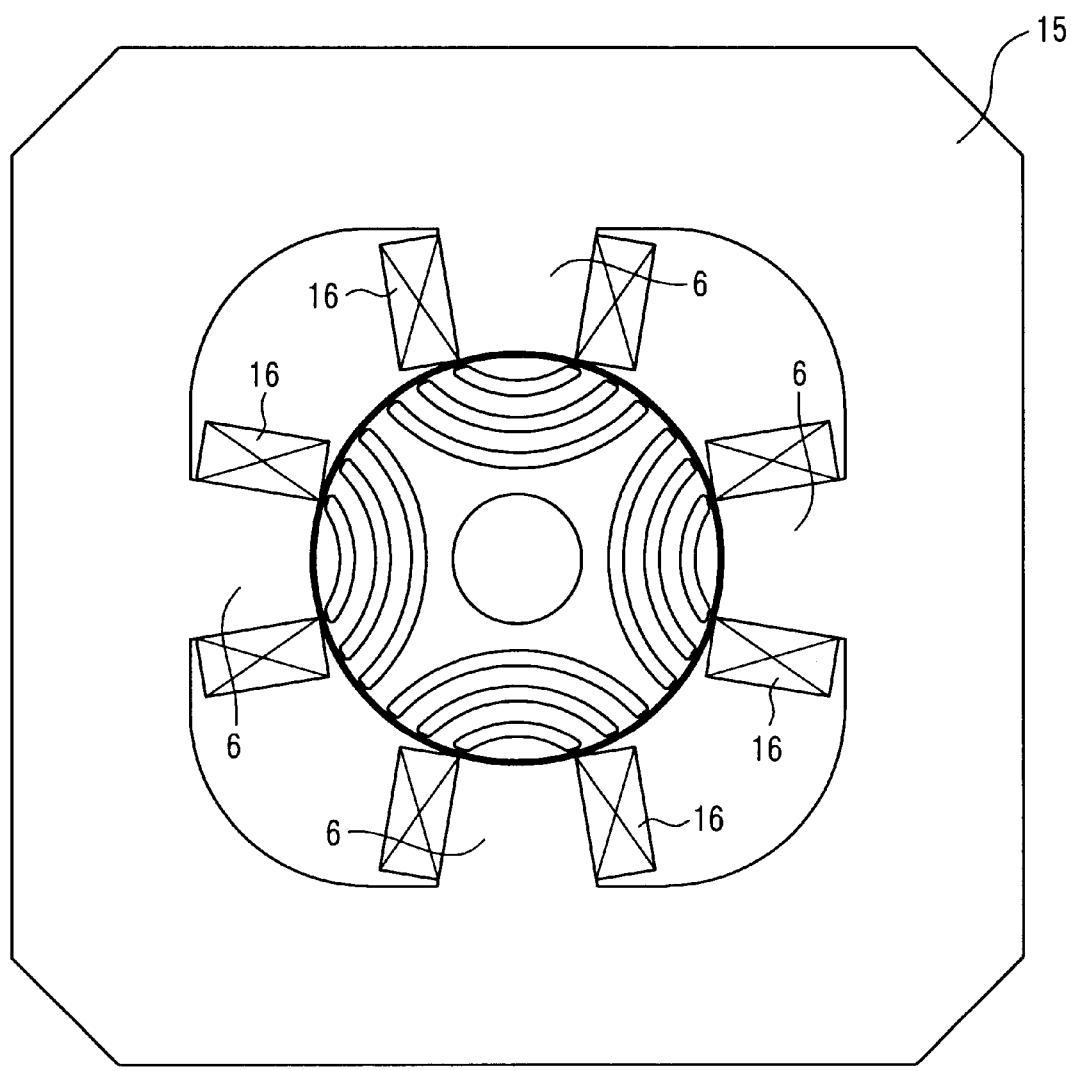
FIG. 5 is a plan view showing a variation of the orientation device of this invention, corresponding to FIG. 1(b)

Further, although in the foregoing embodiment, an example has been shown in which pole pieces 6 are disposed between permanent magnets 5, and resinous magnets are orientated by magnetic flux generated by the permanent magnets 5, a solenoid member 15 connecting the outside circumferential portions of the pole pieces 6 may be provided integral with the pole pieces 6 to form a magnetization yoke, and solenoid coils 16 may be wound on the pole pieces 6, respectively, as shown in FIG. 5, so that resinous magnets are orientated by magnetic flux generated by the solenoid coils 16, in which case, efficient and sufficient orientation of the resinous magnets 3 filled in the slits 2 for each magnetic pole of the rotor core 1 can be effected, as in the case where permanent magnets 5 are used. Alternatively, if solenoid coils 16 are wound on the pole pieces 6, they may be used as a magnetization device for magnetizing permanent magnets disposed in the slits 2 of the rotor core 1, effecting efficient and sufficient magnetization of the permanent magnets disposed in the slits 2 for each magnetic pole of the rotor core 1, as in the case where they are used as an orientation device.

As described above, since in the orientation device according to this invention, the width of the pole piece at the end on the side of the rotor core housing section is smaller than that of an outermost slit of the rotor core between opposite ends thereof, magnetic flux generated by orientating magnets is prevented from avoiding resinous magnets filled in the outermost slits of the rotor core, which enables efficient and sufficient orientation of the resinous magnets filled in the slits for each magnetic pole of the rotor core, whereby a larger output torque is effected in a rotary electric machine using such an embedded magnet type rotor, improving performance for the rotary electric machine.

Also, since in the magnetization device according to this invention, as in the orientation device of this invention, the width of the pole piece at the end on the side of the rotor core housing section is smaller than that of an outermost slit of the rotor core between opposite ends thereof, magnetic flux generated by solenoid coils for magnetization is prevented from avoiding permanent magnets filled in the outermost slits of the rotor core, which enables efficient and sufficient magnetization of the permanent magnets disposed in the slits for each magnetic pole of the rotor core, whereby a larger output torque is effected in a rotary electric machine using such an embedded magnet type rotor, improving performance for the rotary electric machine.

What is claimed is:

1. An orientation device adapted to house a rotor core of an embedded magnet type rotor inside for orientating resinous magnets filled in silts for each magnetic pole of the rotor core, said orientation device comprising a plurality of permanent magnets disposed at the same intervals as said slits with their magnetic poles of the same polarity adjacent to each other, along the outside circumference of a rotor core housing section for housing said rotor core, and a plurality of pole pieces made of a ferromagnetic material and disposed between said plurality of permanent magnets; characterized in that the width of said pole piece at the end on the side of said rotor core housing section is smaller than that of an outermost slit of said rotor core between opposite ends thereof.

2. The orientation device according to claim 1, wherein the width of said permanent magnet is larger at the end on the side remote from said rotor core housing section than at the end on the side of said rotor core housing section.

3. The orientation device according to claim 1, wherein a member disposed around said pole pieces and said permanent magnets is made of a non-magnetic material.

4. An orientation device adapted to house a rotor core of an embedded magnet type rotor inside for orientating resinous magnets filled in slits for each magnetic pole of the rotor core, said orientation device comprising a plurality of pole pieces made of a ferromagnetic material and disposed at the same intervals as said slits along the outside circumference of a rotor core housing section for housing said rotor core, solenoid coils wound on said pole pieces, and a connection member made of a ferromagnetic material and connecting the outside circumferential positions of said pole pieces; characterized in that the width of said pole piece at the end on the side of said rotor core housing section is smaller than that of an outermost slit of said rotor core between opposite ends thereof.

5. A magnetization device adapted to house a rotor core of an embedded magnet type rotor inside for magnetizing permanent magnets disposed in slits for each magnetic pole of the rotor core, said magnetization device comprising a plurality of pole pieces made of a ferromagnetic material and disposed at the same intervals as said slits along the outside circumference of a rotor core housing section for housing said rotor core, solenoid coils wound on said pole pieces, and a connection member made of a ferromagnetic material and connecting the outside circumferential portions of said pole pieces; characterized in that the width of said pole piece at the end on the side of said rotor core housing section is smaller than that of an outermost slit of said rotor core between opposite ends thereof.

* * * * *